United States Patent [19]

Wedekind

[11] Patent Number: 5,115,967
[45] Date of Patent: May 26, 1992

[54] METHOD AND APPARATUS FOR ADAPTIVELY OPTIMIZING CLIMATE CONTROL ENERGY CONSUMPTION IN A BUILDING

[76] Inventor: Gilbert L. Wedekind, 698 McGill, Rochester Hills, Mich. 48309

[21] Appl. No.: 670,718

[22] Filed: Mar. 18, 1991

[51] Int. Cl.⁵ .................. F23N 5/20; G05D 23/00
[52] U.S. Cl. .................. 236/46 R; 165/12; 236/91 R
[58] Field of Search .......... 236/46 R, 91 R, 91 E; 165/12; 364/505

[56] References Cited

U.S. PATENT DOCUMENTS

| | | | |
|---|---|---|---|
| 4,432,232 | 2/1984 | Brantley et al. | 73/432 R |
| 4,660,759 | 4/1987 | Barnard et al. | 236/46 R |
| 4,897,798 | 1/1990 | Cler | 364/505 |
| 5,025,984 | 6/1991 | Bird et al. | |

*Primary Examiner*—William E. Wayner
*Attorney, Agent, or Firm*—Reising, Ethington, Barnard, Perry & Milton

[57] ABSTRACT

A computer (37) or microprocessor-based thermostat system (10) for automatically determining and implementing an optimum thermostat setback schedule (80) which, while maintaining a user-specified occupancy comfort schedule (39), minimizes the energy consumption of the climate control system (18) within an enclosure (30). The method of the thermostat assembly (10), using the continuous measurement of various air temperatures, fluid flows, and energy consumption rates includes the adaptive capability of indirectly learning the relevant thermal and thermodynamic characteristics of both the enclosure (30) and the climate control system (18), including such thermal parameters as the effective thermal capacitance of the internal walls and contents (53,55) of the enclosure (30), the effective internal heat transfer conductance between the thermal capacitance and the air within the conditioned space (28), the effective external heat transfer conductance between the inside air (28) and the outside air (36) and the efficiency of the climate control system (18), which includes the associated air distribution system (22, 32), as a function of its input energy rate.

The method also includes a non-linear efficiency model, using the aforementioned thermal parameters, which has the capability of predicting, in advance of implementation, the energy consumption of the climate control system (18) as a function of outside air temperature and the user-specified occupancy comfort schedule (39). An optimization scheme is then used to determine the most energy efficient thermostat setback schedule (80) for the current outdoor air temperature, while still satisfying the user-specified occupancy comfort schedule (39).

26 Claims, 6 Drawing Sheets

METHOD AND APPARATUS FOR ADAPTIVELY OPTIMIZING CLIMATE CONTROL ENERGY CONSUMPTION IN A BUILDING

BACKGROUND ART

1. Field of the Invention

The subject invention relates to electronic thermostats. More particularly, the subject invention relates to adaptive electronic energy management thermostats having the ability to measure the parameters of a building, its climate control system and its surrounding environment and to optimize the efficiency of energy consumption as a function of these parameters.

2. Description of Related Art

Automated energy management thermostats have progressed in sophistication since their inception. Originally, energy management thermostats merely automated the age-old practice of turning the thermostat down manually when the building was not being used or when the occupants where sleeping, in the case of the residential building.

The automatic, adaptive thermostats progressed in sophistication, as shown by U.S. Pat. No. 4,660,759 to Barnard et al, issued Apr. 28, 1987. This patent discloses a thermostat assembly, which predicts, based on the outside temperature, the inside temperature and the temperature drift rate, which is calculated from measured temperatures from the day before, the time necessary to change the output of the climate control system in order to reach the desired set-point temperature at the desired time. This thermostat assembly recognizes the fact that the conditioned space of an enclosure such as a building will require different amounts of time to achieve the desired set-point temperature at the desired time, and that the varying times are dependant on the surrounding environment. Although this design recognizes the fact that the time required to raise or lower the temperature of a condition space varies as a function of outdoor air temperature, it does not have the capabilities to include other thermal characteristics of the building and the climate control system that have an effect on the time required to reach the desired temperature. Also, inherent in the technique used, is the assumption that the inside air temperature varies linearly with time when the climate control system is on or off. As demonstrated in FIG. 2, the temperature is not linear with time (43),(40).

U.S. Pat. No. 4,897,798 to Cler, issued Jan. 30, 1990 discloses an adaptive thermostat assembly capable of predicting the start up time to activate the climate control system in order to reach the desired setpoint temperature at the desired time. This thermostat assembly recognizes heat transfers are occurring between air inside the building and the outside air, and that thermal energy is stored in the internal walls and contents within the building enclosure. In addition, this thermostat assembly considers the oscillation of temperature during quasi-steady state times, i.e., the times when the thermostat is maintaining a particular set-point temperature, and cycles the climate control system on and off in order to maintain that temperature within a particular range around the set-point temperature. This thermostat assembly does not have the capabilities to include other thermal characteristics of the building and the climate control system that have an effect on the time required to reach the desired temperature because assumptions have been made to simplify the model, the required measurements and the computations.

U.S. Pat. No. 4,432,232 to Brantley et al. issued Feb. 21, 1984 discloses an apparatus and method for measuring the efficiency of a heat pump. The apparatus measures, via temperature sensitive resistance measurements and a wattmeter, the amount of energy input with respect to the amount of energy output in the form of thermal energy. This system is applicable for heat pumps already in operation or it may be incorporated into the design of the heat pump so the apparatus and heat pump may be packaged together as a unit. Although it is of value to know the efficiency of the heat pump, this measurement does not reflect the total efficiency of the climate control system because there are losses in the air distribution system, thus further reducing efficiency.

In summary, none of the prior art discloses an assembly which takes into consideration the thermal parameters which account for the non-linearity of the inside air temperature as a function of time in order to accurately determine the proper start up times to have an enclosure reach a desired set-point temperature at a desired time. Also, none of the prior art discloses an assembly which is capable of predicting, in advance of implementation, the energy consumption of the building's climate control system at the existing outside air temperature, and then optimize the thermostat setback schedule to minimize energy consumption, while satisfying a user-specified occupancy comfort schedule.

SUMMARY OF THE INVENTION AND ADVANTAGES

A thermostat assembly for changing the output of a climate control system of an enclosure defining a conditioned space is disclosed. The thermostat assembly utilizes inside and outside air temperature measurements, and comprises input means for inputting an occupancy comfort schedule, which results in a thermostat setback schedule, which in turn causes a plurality of temperature transition domains separating a plurality of quasi-steady state domains. The assembly also comprises inside sensing means for measuring the temperature of the inside air and outside sensing means for measuring the temperature of the outside air. The assembly is characterized by processing means for adaptively developing and storing a non-linear empirical model representing the climate control system efficiency as a function of input energy rate and for receiving the temperatures of the inside air and the outside air and for changing at least one of the plurality of sections utilizing the non-linear efficiency model for optimizing energy consumption as a function of the inside and outside air temperatures. The subject invention utilizes several measured inputs to calculate various thermal and thermodynamic parameters of the enclosure and its climate control system, including the parameters of the non-linear efficiency model, to more accurately achieve predetermined temperatures at predetermined times in addition to achieving these conditions while optimizing energy consumption.

BRIEF DESCRIPTION OF THE DRAWINGS

Other advantages of the present invention will be readily appreciated as the same becomes better understood with reference to the following description when considered in connection with the accompanying drawings wherein.

DETAILED DESCRIPTION OF THE DRAWINGS

The subject invention and the environment in which it will be used will be presented in great detail initially. Following this presentation, the method of use as well as the physical and mathematical representations will be presented.

Figure 3:
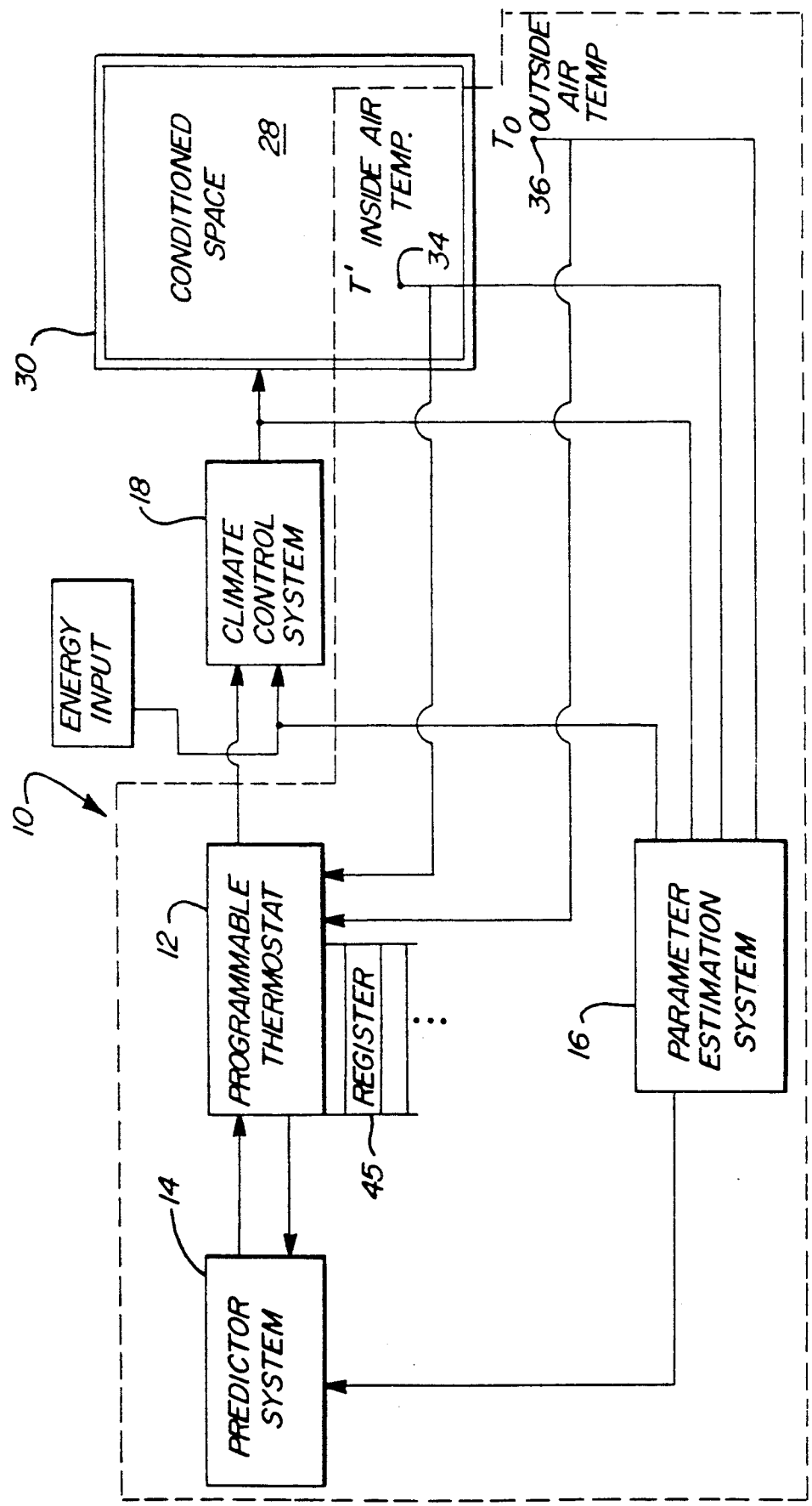
FIG. 3 is a block diagram of the subject invention.

The subject invention is a thermostat assembly and is generally shown at 10 in the Figures. FIG. 3 shows a thermostat assembly 10 which includes three parts, the programmable thermostat 12, the predictor system 14, and the parameter estimation system 16. Both the programmable thermostat 12 and the parameter estimation system 16 are connected to the climate control system 18. The climate control system 18 can include either a heating system such as a furnace or a heat pump, or it may be a cooling system such as an air conditioner. For purposes of convenience, the remainder of the description of the subject invention 10 will be operating with a heating system. However, it will be appreciated by anyone skilled in the art that a similar description with a cooling system could be made using the same thermostat assembly 10. Also for convenience, the word furnace will be used to describe any type of climate control apparatus. Such apparatuses could be electric, oil, or gas burners, a heat pump, or any other apparatus which is connected to a source of fuel, consumes the fuel and emits thermal energy or heat as a major product.

The climate control system 18 includes a furnace 20 and air distribution ducts, generally indicated at 22. The ducts 22 include warm air ducts 24 and return air ducts 26. The warm air ducts 24 transport the air warmed by the furnace 20 to the condition space 28 defined by the enclosure 30. The return air ducts 26 allow the air which has cooled to return to the furnace 20 for reheating. Although it is not necessary, a blower 32 is normally used to force the air through the furnace 20 to be heated wherein the forced air will proceed through the warm air ducts 24. When the inside air is passing through the climate control system 18, it will be distinguished from the inside air as the distributed air.

Returning to FIG. 3, the thermostat assembly 10 further includes inside air temperature sensors, generally indicated at 34, and outside air temperature sensors, generally indicated at 36. A plurality of both the inside 34 and outside 36 air temperature sensors are required to provide accurate average temperature measurements of both spaces, inside and outside, because both the inside and outside temperatures will vary some as a function of location. The thermostat assembly 10 further includes distribution air temperature means 58 located near at least one of a plurality of outlets 60 of the warm air ducts 24 to measure the temperature of the distributed air. More particularly, the distribution air temperature sensor means includes a plurality of distribution air temperature sensors 58, each having an output and each located near one of the plurality of outlet ports 60.

Input means 38 allows a user to input a schedule 39 of set-point temperatures and times, sometimes referred to as an occupancy comfort schedule 39. A graphic representation of this schedule 39 may be seen in FIG. 2 with temperature on the Y-axis as a function of time on the X-axis. The occupancy comfort schedule includes the comfort set-point temeprature, $T_f$, 39 and the corresponding times of the day when the climate control system is to maintain the comfort temperature 39. Thermostat setback 80 takes place to conserve energy at times when occupancy comfort 39 is not scheduled. The resulting inside air temperature comprises a plurality of temperature transition domains, generally shown at 40, which separate a plurality of quasi-steady state domains, generally shown at 42. The input means 38 may comprise any suitable push-button electronic keyboard including a plurality of alphanumeric keys and a plurality of operation keys. In the case where the thermostat assembly 10 is housed in a computer 37, the input means 38 is the keyboard of the computer 37. The operational keys may provide access to the setting operation and the verifying operations of the thermostat assembly 10. An operation key is used to set and input the information requested by the prompts given by the thermostat assembly 10. If the operator wished to verify the occupancy comfort schedule 39 or view a current temperature, the operator would press the verify button and, again, input the information desired following the prompts given by the thermostat assembly 10. The schedule 39 and associated thermostat setback schedule 80 will be discussed in greater detail subsequently.

The thermostat assembly 10 is characterized by processing means, generally indicated at 44. The processing means 44 stores a non-linear efficiency model therein so it may be used to predict, in advance of implementation, the time required for air warm-up or cool down, the energy consumption, and to optimize the energy consumption as a function of the inside and outside air temperatures. The processing means 44 receives the temperatures of the inside and outside air as measured by the inside 34 and outside 36 air temperature sensors. The processing means 44 also receives temperatures of the distributed air from the sensors located at the warm air register 60. The processing means 44 optimizes the thermostat setback schedule 80 by changing the setback temperature 81, $T_f'$, as determined necessary by the calculations by the processing means 44 using the non-linear efficiency model.

The processing means 44 may comprise a computer 37 or a dedicated microprocessor. The computer 37 may be a personal computer having data acquisition capabilities and sufficient memory capabilities to store all the data retrieved by the data acquisition system. The processing means 44 must have the capabilities of receiving and storing data received from the various sensors, i.e., the distribution air temperature sensors 58, and the inside 34 and outside 36 air temperature sensors, calculating the output requirements of the furnace 20 so the condition space 28 of the enclosure 30 may be maintained at the proper inside temperature as is dictated by the input comfort schedule 39 and commanding the furnace 20 when to output the energy necessary to maintain the comfort schedule 39. The thermostat assembly 10 includes energy sensor means 46 for measuring the input energy rate (i.e., fuel and/or electrical) of the climate control system 18. The assembly 10 includes distribution air temperature sensors 58 located near the outlets of the warm air ducts 24, which along with the sensors 34 for measuring the inside air temperatures and circulation air flow rate, 48 are used for determining the amount of energy via the temperature of the distributed air which is output by the climate control system 18. These measurements will be used to determine the efficiency of the climate control system 18.

Figure 4:
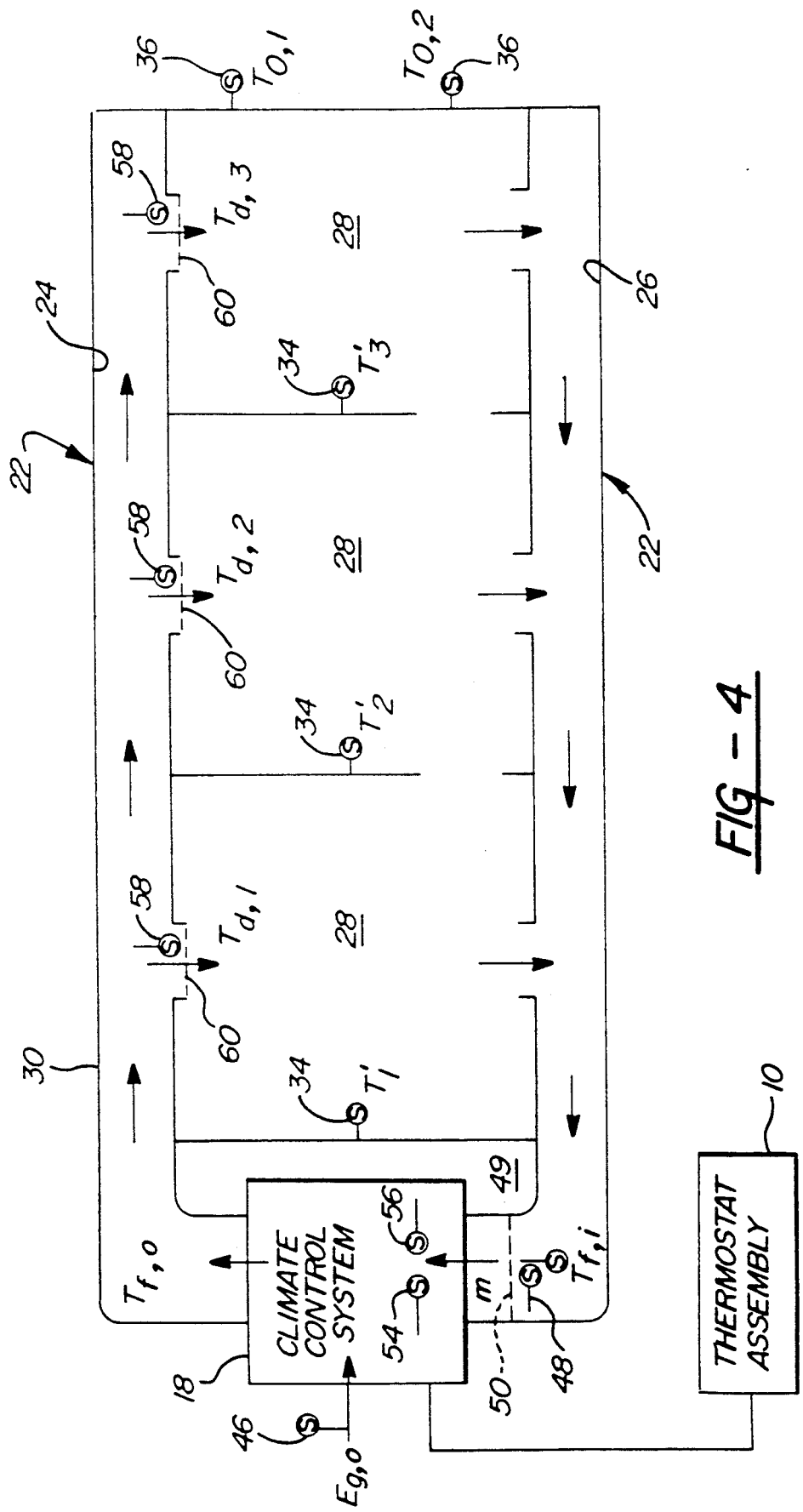
FIG. 4 is a plan view of the preferred embodiment of the subject invention in an enclosure.
Figure 5:
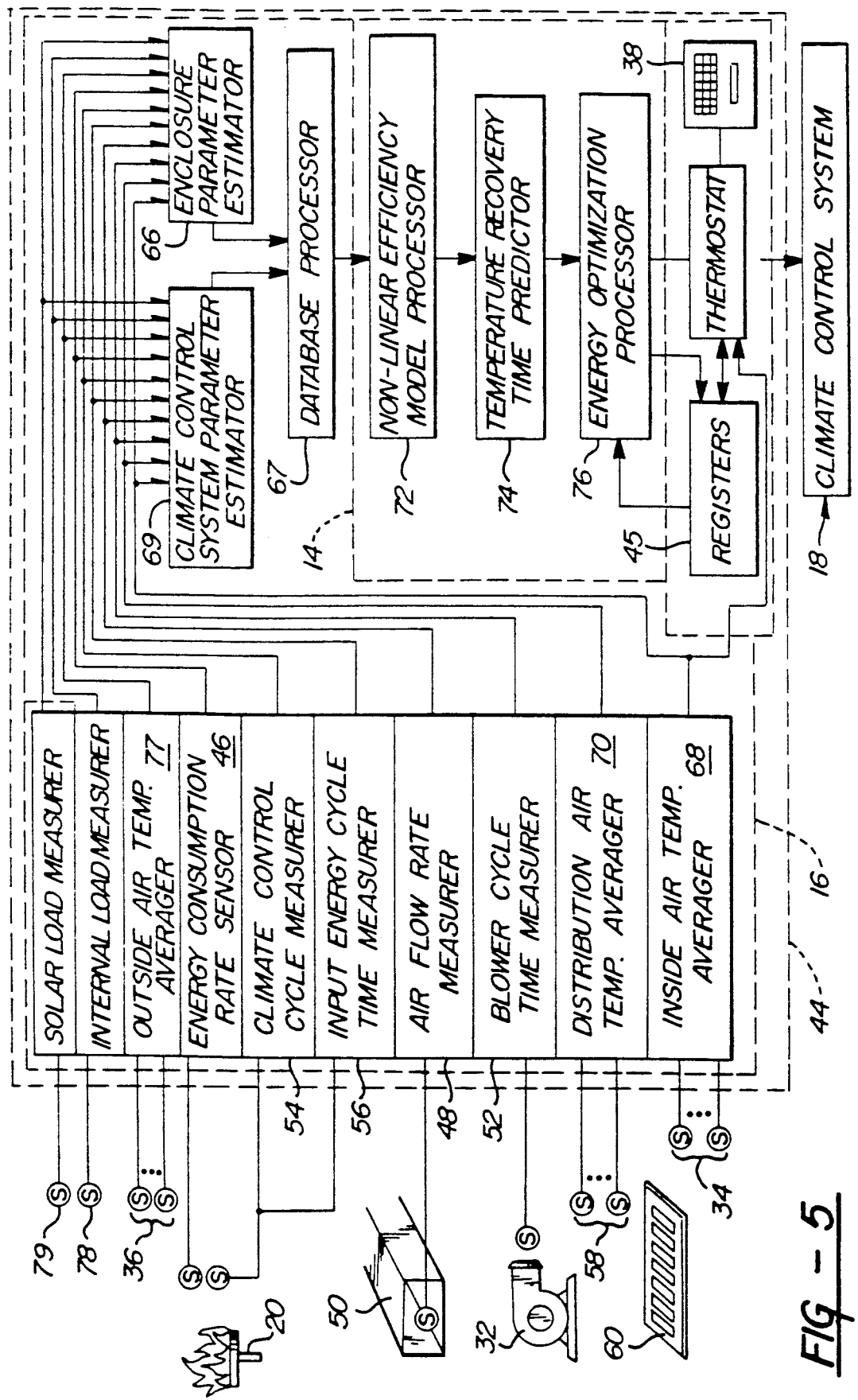
FIG. 5 is a block diagram of the processing means.
Figure 6:
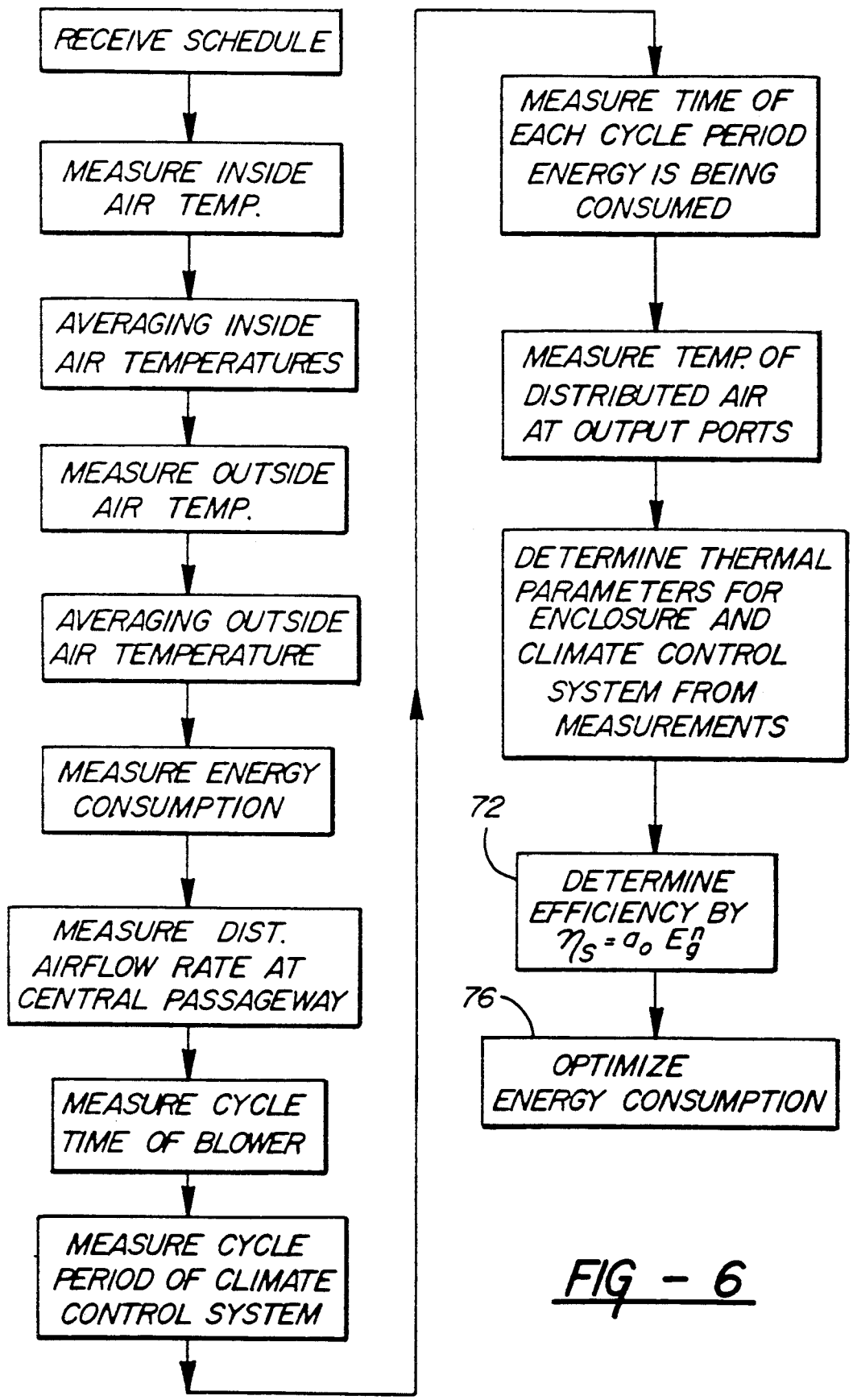
FIG. 6 is a flowchart showing the functions of the processing means.

Circulation flow means 48 is used for measuring the flowrate of the distributed air at the central passageway 50 of the return air ducts 26. The central passageway 50 is best shown in FIG. 4 and defines a location in the return air ducts 26 where all the distributed air must pass therethrough. Since the inside air temperature of the enclosure 30 during the quasi-steady state domains 42 of an occupancy comfort schedule 39 is controlled by cycling the furnace 20 on and off, the processing means 44 further includes input energy cycle time sensor means 56 for measuring the amount of time the input energy 46 is flowing, $t_e$, the cycle time sensor means 54 for measuring the time duration of each climate control cycle, $t_c$, and the blower cycle clocking means 52 for measuring the amount of time, $t_b$, the circulation system 32 is in operation during each cycle. These times will vary depending on the demands of the climate control system 18 as a function of the occupancy comfort schedule 39, the outside air temperature 36, and the thermostat setback schedule 80. A graphic representation of these time variations is indirectly shown in the second or lower graph of FIG. 2. The Y-axis consists of the average input energy rate, $E_g$, as a function of time, which is graphed on the X-axis. Since the input energy of the furnace 20 is cyclical, i.e., it is either off or it is on producing an output energy rate, the average input energy rate, $E_g$, as shown in FIG. 2 and described by the formula below:

$$E_g = E_{g,0}\left(\frac{t_e}{t_c}\right) \quad (1)$$

In words, the average input energy rate, $E_g$, is the input energy rate, $E_{g,0}$, when the furnace 20 is on, multiplied by the ratio of times, they being the time during which the furnace 20 is on and the time, $t_c$, that represents the climate control system's 18 cycle time.

Figure 1:
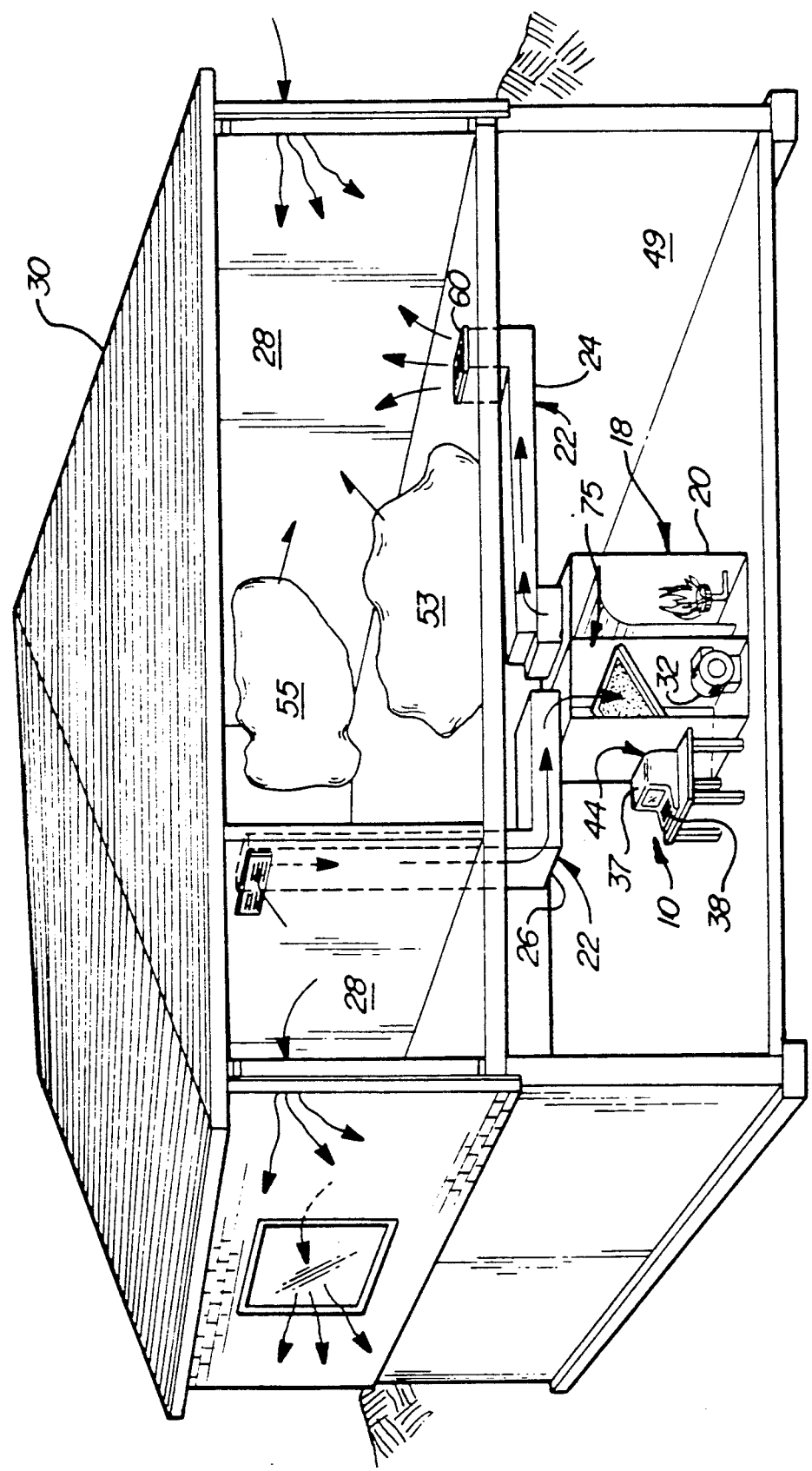
FIG. 1 is a perspective view of the preferred embodiment of the subject invention installed in an enclosure partially cut away.
Figure 2:
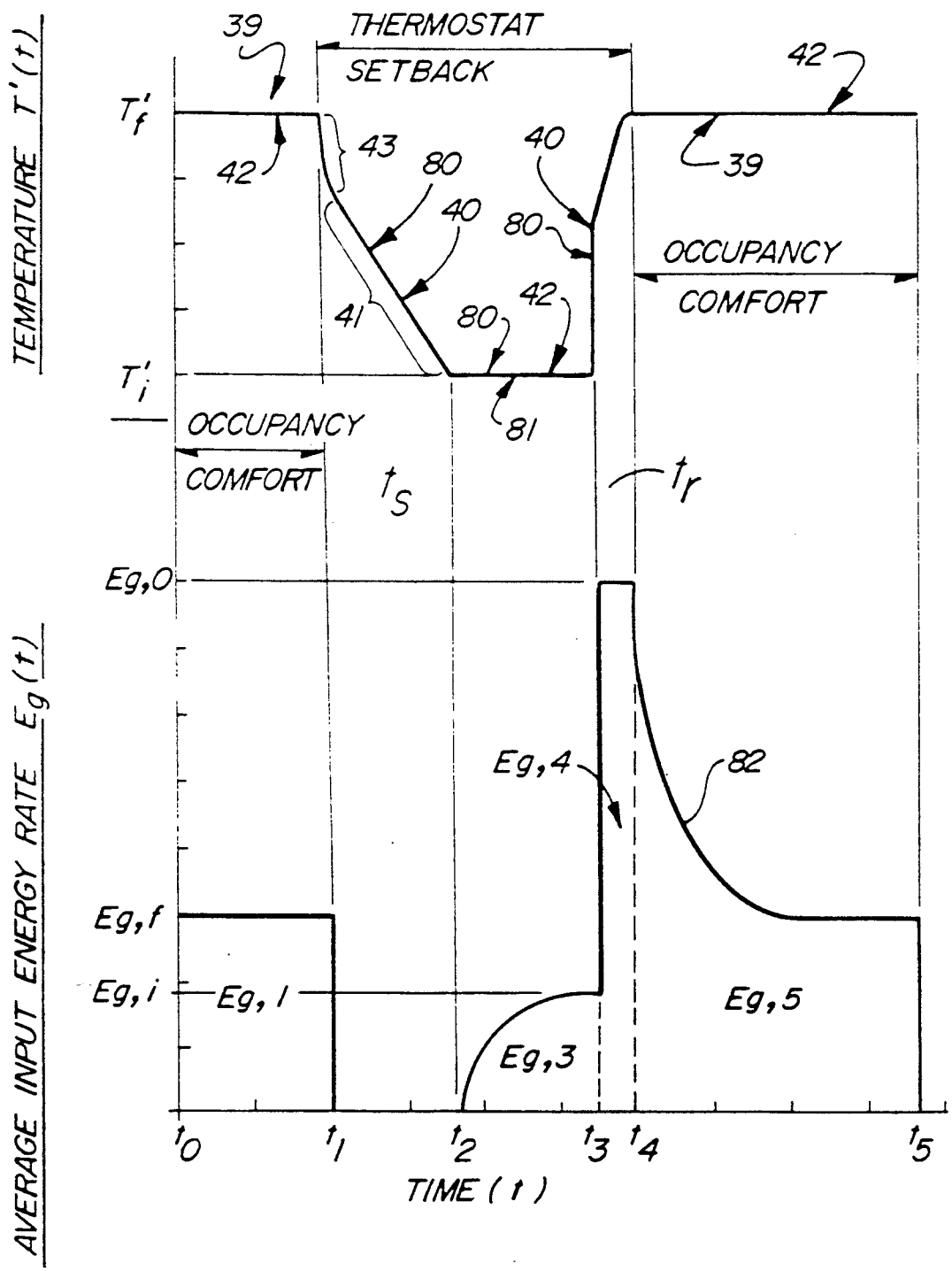
FIG. 2 is a graph representing temperature of the air in a conditioned space as a function of time and average energy as a function of time during a typical thermostat setback.

Turning our attention to FIG. 2, it can be seen that the temperature and the average input energy rate are both graphed as a function of time wherein the graph represents different segments of time and the respective average input rates and temperatures for a particular segment of time. The occupancy comfort time domains, $t_0-t_1$ and $t_4-t_5$, represent the times in which the occupants of the enclosure 30 are using the enclosure 30 and want it comfortable. The thermostat setback time domain, $t_1-t_4$, represents the time in which the occupants of the enclosure 30 are not present in the case of commercial or residential enclosures 30, or asleep in the case of residential enclosures 30. For simplification, the following example will describe a typical occupancy comfort schedule 39 of a commercial building. The times of this example are listed below:

| TIME VARIABLE | EXAMPLE TIME |
| --- | --- |
| $t_0$ | 1:00 p.m. |
| $t_1$ | 5:00 p.m. |
| $t_2$ | 11:00 p.m. |
| $t_3$ | 5:00 a.m. |
| $t_4$ | 7:30 a.m. |
| $t_5$ | 1:00 p.m. |

From 1:00 p.m. to 5:00 p.m., $t_0-t_1$, the thermostat is set at $T_f$, i.e., 72° F., to provide a comfortable temperature for the occupants of the enclosure. The occupancy comfort temperature $T_f$ is sometimes referred to as the set-point temperature. Because the temperature has been at $T_f$ for some time, the average input energy rate $E_g$ will be constant. Actually, the inside temperature $T_f$ is fluctuating or oscillating above and below the set-point temeprature $T_f$. The non-linear efficiency model, however, treats the inside air temperature $T_f$ as the mean of the oscillating inside temperature. The average input energy rate $E_g$ is constant because the amount of heat loss from the enclosure 30 to the outside environment and the amount of heat delivered to the enclosure 30 by the climate control system 18, and any energy emitting bodies 53 such as appliances, lights, people, etc. are in thermal balance. In other words, the temperature of the conditioned space 28 has reached a thermal equilibrium with the internal thermal capacitance 55 (internal walls and contents) of the enclosure 30.

At 5:00 p.m., when a majority of the occupants leave the enclosure 30, the thermostat setback schedule 80 is implemented where the set-point temperature is reduced to the setback temperature, $T_i$, 81. From 5:00 p.m. to 11:00 p.m., $t_1-t_2$, the average input energy rate $E_g$ drops to zero because the inside air temperature is greater than the setback temperature. At time $t_2$, the temperature reaches the temperature, $T_i$, the setback temperature 81, at which time the furnace 20 begins to output thermal energy to maintain the condition space 28 at the setback temperature, $T_1$. Although the operator initially selects a desired setback temperature, at the time, $t_1$, when the thermostat setback schedule 80 is initiated, the processing means 44 will automatically change the setback temperature if it computes, using the non-linear efficiency model a more energy efficient setback temperature exists for the existing outside air temperature and occupancy comfort schedule 39. For example, the operator may initially set the setback temperature to 65° F. The thermostat assembly 10 will calculate the savings in energy by dropping the temperature from the occupancy comfort temperature, 72° F., to the desired setback temperature, 65° F. This savings of energy takes into consideration the energy consumed when returning the temperature of the conditioned space 28 to the occupancy comfort temperature, $T_f$. If the thermostat assembly 10 calculates that a higher temperature for the setback temperature, say 67° F., will consume the least amount of energy while maintaining the specified occupancy comfort schedule 39, the thermostat assembly 10 will automatically adjust the setback temperature, $T_i$, to 67° F.

Beginning at time $t_2$, the average energy rate $E_g$ increases with time as the walls and contents 53 within the enclosure 30 cool down to the setback temperature. Eventually, the average input energy rate $E_g$ will level off at $E_{g,i}$ which is adequate to maintain the temperature of the condition space 28 at $T_i$. Then at 5:30 a.m., $t_3$, the average input energy rate $E_g$ will increase to its maximum value, $E_{g,0}$, so the conditioned space 28 may recover the lost thermal energy or, in other words, return to the temperature, $T_f$, representing the desired occupancy comfort temperature. The average input energy rate $E_g$ will continue to operate at a maximum value, $E_{g,0}$, until the temperature of the conditioned space 28 reaches the temperature $T_f$, shown at 7:30 a.m., $t_4$. At time $t_4$, the average input energy rate, $E_g$, will begin to drop off until it eventually reaches an average input energy rate of $E_{g,f}$ as the internal thermal capacitance 55 (internal walls and contents) within the enclosure 30 also warms up to the occupancy comfort temperature, $T_f$. This final average input energy rate, $E_{g,f}$, will be equal to the average input energy rate, $E_{g,f}$, during the time domain $t_0-t_1$ if the outside temperature remains constant, because the comfort set-point temperature, $T_f$, of the building is the same in both time domains.

The thermostat assembly 10 further includes the capability via the non-linear efficiency model to predict in advance the time period, $t_r$, necessary for temperature recovery from the setback temperature, $T_i$, to the occupancy set-point or comfort temperature, $T_f$. This prediction is done in the predictor system 14, and the recovery time, $t_r$, is sent to the programmable thermostat so that the setback temperature, $T_i$, can be raised to the set-point temperature, $T_f$, enough time in advance so that the air temperature reaches the comfort temperature, $T_f$, at the beginning of the specified comfort time domain, $t_4$. The processing means 44 receives additional inputs from the distribution air temperature means 58, which measures the temperature of the distributed air near at least one of the plurality of outlet ports 60 of the climate control system 18. This measurement reflects how much thermal energy is delivered to the conditioned space 28. The flowrate of the distributed air is measured at the central passageway 50 of the return air duct 26. The processing means 44 incorporates these measurements in determining the efficiency of the climate control system 18.

The predictor system 14 incorporates the various thermal parameters, obtained by the parameter estimation system 16 from past performance of the enclosure 30 and the climate control system 18, and the current outside air temperature 36 and occupancy comfort schedule 39, to predict the setback temperature $T_i$ which represents the most efficient quasi-steady state setback temperature $T_i$ as well as the recovery time $t_r$ necessary to return the inside air to the occupancy comfort temperature $T_f$. The parameter estimation system 16 stores the past performance data in a set of registers 45 in the computer 37. The information in the form of thermal parameters stored in the registers 45 represent a database that is continually updated as any changes in the enclosure 30 or climate control system 18 occur. Such changes may include the effect of increased infiltration due to new cracks in the structure or around windows and doors, of the enclosure 30, new insulation added to the enclosure 30, replacement of windows, changes in the furnace 20, the air distribution ducts 22, or the like. This capability makes the thermostat assembly 10 an adaptive system. The integrity of the database is protected by a learning scheme which does not allow a single thermal parameter measurement to have a large affect on the database for that particular parameter. Therefore, it would take a number of new values of a particular parameter to replace the existing database for that parameter.

The parameter estimation system 16 contains the processing means 44 for estimating the thermal parameters associated with the climate control system 18. A coefficient $a_o$ and an exponent n represent parameters of the climate control system 18 which are associated with the non-linear manner in which the climate control system efficiency, $\eta_s$, varies with the input energy rate, $E_g$. The coefficient $a_o$ and the exponent n are determined by finding values for the coefficient $a_o$ and the exponent n which best fit the efficiency data obtained by the parameter estimation system 16. The non-linear efficiency model of the predictor system 14 includes the climate control system efficiency expressed by the non-linear equation:

$$\eta_s = a_o E_g^n \qquad (2)$$

It may be seen that non-linearity of the model would be eliminated if the exponent n equals zero (0). This will only happen if the efficiency of the climate control system 18, which includes the air-distribution system 22,32, is independent of the input energy level, $E_g$, or the duty-cycle of the climate control system 18. The efficiency of all known climate control systems 18 are dependent upon their input energy level or duty-cycle. There are several physical causes for this non-linearity, loss from the furnace and air-distribution system during the off time of an operating cycle, combustion efficiency variation with duty-cycle, and variation in energy conversion efficiency of a heat pump due to evaporator/condenser temperature differences as a result of different energy operating levels or duty-cycles. Some of these physical causes can be concurrent. Therefore, for all practical purposes, the efficiency of climate control systems will be a non-linear function of the input energy rate.

In addition, the value of n for some heat pump systems could be negative. Where other systems fail to consider the differences between a heat pump and conventional heating systems, the subject model is capable of automatically operating in conjunction with the heat pump as well as conventional climate control systems without any modifications.

The inside sensing means 34 comprise a plurality of inside air temperature sensors 34 spaced throughout the conditioned space 28. Each of the plurality of inside air temperature sensors 34 have an output which is sent to the inside air temperature averaging means 68. The inside air temperature averaging means 68 averages the outputs associated with each of the plurality of inside air temperature sensors 34. This temperature pre-averaging is not necessary but reduces the computational complexity within the parameter estimation system 16. Likewise, distribution air temperature means 58 comprises a plurality of distribution air temperature sensors 58, each located near one of the plurality of outlet ports 60 of the warm air ducts 24 of the climate control system 18. Each of the plurality of distribution air temperature sensors 58 has an output which is received by the processing means 44. A distribution air temperature averaging means 70 is used to average the outputs associated with each of the plurality of distribution air temperature sensors 58. Similarly, outside air temperature sensing means 36 comprises a plurality of air temperature sensors 36. Each of the sensors has an output which is received by an outside air temperature averager 77 as a means for averaging the outputs of the outside air temperature sensors 36.

The purpose of the parameter estimation system 16 is to indirectly measure the various thermal and thermodynamic parameters of an enclosure 30 and its associated climate control system 18. This capability makes the thermostat assembly 10 an adaptive system. The parameter estimation system 16 utilizes inside air temperature 34, outside air temperature 36, and the temperature of distributed air at the warm air duct outlet ports 60. It also uses the flowrate of the distributed air 48, the input energy rate 46, the cycle time 54 of the climate control system 18, the time 56 the furnace input energy 46 is flowing during each cycle, and the time the air distribution blower 32 is on during each cycle.

The parameter estimation assembly 16 may operate independent of the thermostat assembly 10. Operated independently by competent technicians, the parameter estimation assembly 16 will be useful for building and climate control system evaluation, diagnostic testing and inspection. The parameter estimation system 16 could also be used by competent technicians to determine the thermal and thermodynamic parameters of an enclosure 30 and its climate control system 18 prior to installing the thermostat assembly 10 wherein the purchaser of the thermostat assembly 10 does not wish to purchase the parameter estimation system 16. In other words, the thermostat assembly 10 can be divided into two separate and distinct parts; they being the thermostat assembly 10 which includes the programmable thermostat 12 and the predictor system 14 which includes the non-linear efficiency model, and the parameter estimation assembly 16. Three distinct microprocessors may be designed; one for the complete thermostat assembly 10; and one each for the parameter estimation assembly 16 and thermostat assembly 10 without the parameter estimation assembly 16. It should be recognized that without the parameter estimation assembly 16, the thermostat assembly 10 is no longer an adaptive system.

The parameter estimation assembly 16 includes inside sensing means 34 for measuring the temperature of the inside air and outside sensing means 36 for measuring the temperature of the outside air. It also includes circulation flow means 48 for measuring the flowrate of distributed air through the climate control system 18. The parameter assembly 16 is characterized by processing means 44 for receiving the temperatures from the inside air, the outside air, and the temperature of the distributed air at the outlet ports 60 of the warm air ducts 24.

The parameter estimation assembly 16 further includes energy sensor means 46 for measuring the energy consumption rate of the climate control system 18. For purposes of simplicity here, the input energy consumption rate of the climate control system 18 will be assumed constant when the furnace 20 is on, thus output modulation is accomplished by cycling the furnace 20 on and off. The circulation flow means 48 is used for measuring the flow of the distributed air at the central passageway 50 where all the inside air passes through. Again, barring a poorly maintained system, the air flowrate through the central passageway 50 will remain relatively constant. The parameter estimation system 16 further includes blower cycle clocking means 52 for measuring the amount of time during a cycle when the circulation system such as a blower 32 is operating. The cycle time sensor means 54 is used for sensing the cycle period $t_c$ of the climate control system 18. The input energy cycle time sensor means 56 measures the period of time $t_e$ during each of the cycle periods in which the input energy is entering the climate control system 18. The distribution air temperature means 58 measures the temperature of the distributed air at a minimum of one of the plurality of outlet ports 60 of the warm air duct 24 of the climate control system 18.

The inside sensing means includes a plurality of inside air temperature sensors 34 spaced throughout the condition space 28. Each of the outputs of the inside air temperatures sensors 34 will be transmitted to the processing means 44 of the parameter estimation system 16. The inside air temperature averaging means 68 will average all of the outputs associated with each of the plurality of inside air temperature sensors 34. Each of the plurality of distribution air temperature sensors 58 has an output. A distribution air temperature averaging means 70 receives the outputs of each of the plurality of distribution air temperature sensors 58 and averages those outputs.

The parameter estimation assembly 16 will include inside sensing means 34 for measuring the temperature of the inside air and outside sensing means 36 for measuring the temperature of the outside air. The circulation flow means 48 is incorporated for measuring the flow of the distributed air through the climate control system 18. The parameter estimation assembly 16 is characterized by processing means 44 for receiving the temperatures of the inside air, the distributed warm air and the outside air and the air flowrate, and for quasi-steady state conditions for calculating the rate of heat loss to the outside air. In other words, given the outside temperature, the parameter estimation assembly 16 determines the rate of thermal energy lost to the outside air. This loss of thermal energy is due to such phenomena as air exfiltration, infiltration and heat transfer through the walls, windows, ceiling, etc. of the enclosure 30. Other variables which are measured by the parameter estimation assembly 16 include the energy consumption rate of the climate control system 18, the flowrate of the distributed air at a central passageway 50 of the control system 18, blower cycle clocking means 52 for measuring the amount of time the circulation system 32 is operating, sensing the cycle period of the climate control system 18, measuring the period of time during each of the cycle periods in which the climate control system 18 is receiving an input of energy (in other words, the time fuel is being consumed by the furnace 20), measuring the temperature of the distributed air at an outlet port 60 of the climate control system 18.

The sensors utilized by the thermostat assembly 10 and the parameter estimation assembly 16 are not a part of the subject invention because it is well known that there are different types of sensors for measuring the same parameter or variable in different settings or environments. For example, the inside 34 and outside 36 air temperature sensors may be responsive temperature sensors such as thermocouples or thermistors. It should be noted, however, that the inside air temperature sensors should be located where the temperature will be representative of that of the conditioned space 28. In the preferred embodiment, the inside air temperature sensors 34 are located five feet from the floor of the enclosure 30. The circulation flow means 48 could be a type of velocity measurement probe, an anemometer, or a calibrated nozzle or orifice. Measurements of the flow could be continuous or measured at the time of the installation and assumed constant as long as the blower 32 speed is kept constant, filters 75 kept clean, and air distribution ducting 22 remains unchanged. Another example of a sensor which may be used in the subject invention 10 is the energy sensor means 46. This sensor 46 could be an electrical power meter if the input energy is electrical, or a gas flow meter if the system is gas fired. This measurement could be continuous, or measured at the time of the installation, and assumed constant since gas flow is metered through an orifice plate at a regulated pressure. Gravity heaters, oil fired systems, and some electrically powered systems such as heat pumps or electric furnaces could be treated in a similar manner. All of the timing sensors, i.e., the blower cycle clocking means 52, the cycle time sensor means 54, and the input energy cycle time sensor means 56, comprise solid state relays in conjunction with a solid state electronic clock.

The method of optimizing 76 the energy consumption of a climate control system 18 of an enclosure 30 for a user specified occupancy comfort schedule 39 uses the predictor system 14 of the thermostat assembly 10. The method comprises the steps of receiving an occupancy comfort schedule 39 which defines predetermined comfort temperatures 39 of the condition space 28 at predetermined times and measuring the outside air temperature. The thermostat assembly 10 receives a schedule 39 when the operator inputs the schedule 39 via the input means 38. The method is characterized by utilizing a processing means 44 for using the non-linear efficiency model, stored in the non-linear efficiency model processor 72 as modified by the database processor 67, of the enclosure 30 and climate control system 18 to predict, in advance of implementation, the energy consumption required to carry out a thermostat setback schedule 80 which satisfies the specified occupancy comfort schedule 39. The energy optimization processing means 76 is capable of searching for the particular thermostat setback schedule 80, which includes the particular setback temperature, $T_s$, 81, which will require the least amount of energy consumption yet still satisfy the occupancy comfort schedule 39.

The subject method further includes measuring the input energy rate $E_g$ of the climate control system 18. In addition, the method relies on the thermostat assembly 10 receiving data relating to the measurements of the flowrate of the distributed air at a central passageway 50 of the climate control system 18. Measuring the flow of the distributed air at the central passageway 50 will be used to determine the rate of thermal energy delivered from the furnace 20 of the climate control system 18 to the condition space 28.

The method further includes measuring the cycle time $t_c$ of the climate control system 18, in addition to the period of time $t_e$ during each of the cycle periods of the climate control system 18 in which energy is being inputted to the furnace 20. The times measured in which the climate control system 18 is operating are used in the calculations to determine the efficiency of the climate control system 18.

The thermostat assembly 10 measures the temperature of the distributed air at an outlet port 60 of the climate control system 18. It will be understood that in the preferred embodiment, the thermostat assembly 10 will measure the temperatures of the distributed air at a plurality of outlet ports 60 via the plurality of distribution air temperature sensors 58. This information, coupled with the measurement of the flow rate of the distributed air at the outlet ports 60 is processed in the parameter estimation assembly 16.

Based on the above measurements of the climate control system 18, the parameter estimation system 16 produces a coefficient $a_o$ and an exponent n, both of which are parameters of the climate control system 18. These parameters $a_o$, n are empirically calculated and will be used by the predictor system 14 in determining the efficiency of the climate control system 18.

The non-linear climate control efficiency $\eta_x$ is determined from the nonlinear empirical equation:

$$\eta_s = a_o E_g^n \qquad (2)$$

wherein $E_g$ equals the input energy rate of the climate control system 18. In other words, the climate control efficiency $\eta_s$ is determined or indirectly measured by measuring the variables associated with the thermal energy consumption of the enclosure 30, i.e., inside temperature, outside temperature, flow rates, input energy rate, etc.

The method of operating the parameter estimation assembly 16, when standing alone, is identical to the method discussed above. The parameter estimation assembly 16 does not, however, interact directly with the climate control system 18. It merely measures the output of the climate control system 18 and the reaction of the conditioned space 28 to such an output. Furthermore, the parameter estimation assembly 16 has an enclosure parameter estimating means 66 and a climate control parameter estimating means 69 for a climate control parameter estimating means 69 for estimating the thermal and thermodynamic parameters defining the characteristics of the enclosure 30 and the climate control system 18 of the enclosure 30. The climate control parameter estimating means 69 produces the coefficient $a_o$ and the exponent n used in the non-linear efficiency model.

The following is a description of the methodology for how the measured values for the variables such as temperatures, times, flowrates, etc., are used by enclosure parameter and the climate control system parameter estimating means 66 and 69, respectively, to determine the various thermal and thermodynamic parameters; parameters required by the non-linear efficiency model to correctly determine the most efficient way to maintain the occupancy comfort schedule 39 which was input by the operator.

PARAMETER ESTIMATION METHODOLOGY

Effective Time Constant of Climate Control System;

$\tau_s$

The two direct temperature measurements which are needed are the temperature of the the distributed air 58, $T_d(t)$. They are measured as a function of time t. These measurements are initiated within a typical cycle time $t_c$ a specified time delay after the energy input 46 to the climate control system 18 has been shut off by the thermostat assembly 10, but while the blower 32 is still on. The relationship between the temperature of the distributed air, $T_d(t)$, and the temperature of the inside air 34, $T'(t)$, is an exponential function of time of the form:

$$\frac{T_d(t) - T'(t)}{T_d(t)_{t=0} - T'(t)_{t=0}} = \exp\left(-\frac{1}{\tau_s}\right)t \qquad (3)$$

A method such as the classical "method of least-squares" can be utilized to find the time constant, $\tau_s$, which best fits the measured data. The terms $T_d(t)_{t=o}$ and $T'(t)_{t=0}$ represent the initial measured values of the temperature of the distributed air and the inside air, respectively. The time t represents the lapsed time from the measurement initiation.

Efficiency of the Climate Control System; $\eta_s$

The efficiency of the climate control system, $\eta_s$, is a parameter of major importance. It is indirectly measured for every operating cycle of the climate control system. Also, a non-linear empirical relationship expressing the efficiency, as a function of the operating level, or average input energy rate, of the climate control system is determined from direct measurements. The approach is described in the following paragraph.

The direct temperature measurements of the inside air 34 and the distributed air are necessary and need to be measured as a function of time. Also necessary is the mass flowrate of the distributed air 48, m, the specific heat of air at constant pressure, $c'_p$, the total cycle time 54, $t_c$, the time during the cycle that the blower 32 was on 52, $t_b$, and the time during the cycle when the energy source of the climate control system was on 56,$t_e$. Therefore, the average energy rate, $E_s$, delivered to the conditioned space 28 during a typical climate control system cycle, $t_c$, is indirectly measurable from the following integral equation:

$$E_s = mc_p'\left(\frac{1}{t_c}\right)\int_{t'=0}^{t_b} \{T_d(t') - T(t')\}dt' \quad (4)$$

where:
t' = elapsed time measured from when the blower 32 comes on during a climate control system cycle;
$t_b$ = total time the blower 32 is on; and
$t_c$ = total cycle time.
It should be noted that the integral in equation (4) can be readily evaluated numerically in terms of the discrete temperature measurements made during the cycle time $t_c$. If n discrete temperature measurements are made at equal intervals during the time the blower 32 is on during the cycle time $t_c$, then $$\frac{1}{t_b}\int_{t'=0}^{t_b}\{T_d(t') - T(t')\}dt = \frac{1}{n}\sum_{j=1}^{n}(T_{d,j} - T_j') \quad (5)$$

Thus, equation (4) becomes:

$$E_s = m\frac{t_b}{t_c} C_p' \frac{1}{n}\sum_{j=1}^{n}(T_{d,j} - T_j') \quad (6)$$

The processing means 44 for this computation is contained in the climate control system parameter estimating means 69.

The direct measurements needed for determining the average input energy rate over the cycle, $E_g$, are the total duration of the climate control system cycle time 54, $t_c$, the time 56 the input energy to the climate control system 18 is on, $t_e$, and the input energy rate 46 when the energy source of the climate control system 18 is on, $E_{g,o}$. Therefore, the average input energy rate during the cycle $E_g$ is indirectly measurable from the following integral equation:

$$E_g = \frac{1}{t_c}\int_{t'=0}^{t_e} E_{g,o}dt' \quad (7)$$

If $E_{g,o}$ is a constant during the time, $t_e$, that the energy source of the climate control system 18 is operating, then equation (7) is simplified to the followin algebraic equation:

$$E_g = \frac{t_e}{t_c} E_{g,0} \quad (8)$$

If the climate control system 18 cycle $t_c$ is or can be approximate as a true thermodyamic cycle, then the climate control system efficiency, $\eta_s$, can be indirectly measured for a given cycle in terms of the ratio of the average energy rate delivered to the conditioned space, $E_s$, and the average energy input rate $E_g$. Thus, from equations (6) and (8) the efficiency becomes $$\eta_s = \frac{E_s}{E_g} = \frac{t_b}{t_e}\frac{mc_p'}{E_{g,0}}\sum_{j=1}^{n}(T_{d,j} - T_j') \quad (9)$$

Experimental results for a large number of climate control systems 18 have shown that the climate control efficiency, $\eta_s$, is not a constant but a non-linear function of the input energy rate, $E_g$. Therefore, a valid empirical relationship is of the form:

$$\eta_s = a_oE_g^n \quad (10)$$

If for each climate control system cycle $t_c$, the climate control system efficiency, $\eta_s$, and the corresponding input energy rate, $E_g$, are paired for every cycle during the course of an occupancy comfort schedule 39, which involves a thermostat setback schedule 80, this makes it possible to use a method such as the classical "method of least-squares" to find the empirical parameters, $a_o$ and n, which best fit the empirical data.

As can be seen in FIG. 2, the climate control system 18 usually operates at a maximum input energy rate during the temperature recovery time domain, $t_3-t_4$. Having previously been operating at a much lower input energy rate, the non-linear climate control system efficiency, $\eta_s$, during temperature recovery can sometimes be considerably different (higher or lower) than during normal operations. Therefore, a separate efficiency, $\eta_{s,o}$, distinct from the others is computed and kept as a separate thermal parameter to be used by the non-linear efficiency model when making predictions.

Effective External Heat Conductance between Conditioned Space and Outside Air; ($U_oA_o$)

The only direct measurement needed beyond what has already been discussed is the outdoor air temperature as a function of time, $T_o(t)$. If the climate control system 18 is operating in quasi-steady state, and if, for simplicity, the solar load, $Q_s$, measured by solar sensors 79 (measuring the heat transfer rate of the conditioned space 28 due to solar radiation), and internal load measured by the sensors 78, $Q_i$, due to occupants, lights and appliances, are assumed negligible, the external heat transfer conductance, ($U_oA_o$), can be indirectly measured for a given climate control system cycle, $t_c$, by the following integral relationship:

$$(U_o A_o) = \frac{t_c E_s}{\int_{t'=0}^{t_c} \{(T(t') - T_o(t'))\}dt'} \quad (11)$$

If $Q_s$ and $Q_i$ are not negligible, then $E_s$ in equations 11 and 12 is replaced by $(E_s + Q_s + Q_i)$ where $Q_s$ and $Q_i$ need to be measured during the cycle time, $t_c$.

Again, in terms of n discrete temperature measurements during the cycle time, $t_c$, as was done earlier in equation (5), equation (11) can be expressed as:

$$(U_o A_o) = \frac{E_s}{\frac{1}{n} \sum_{j=1}^{n} (T_j - T_{0,j})} \quad (12)$$

where $E_s$ is measured for the same cycle time $t_c$ and is expressed by equation (6).

If the inside air temperature is being held at the occupancy comfort temperature 39, $T_f$, then equation (12) will compute the effective occupancy comfort external heat transfer conductance which is given the symbol $(U_o A_o)_f$. If the inside air temperature is being held at a setback temperature 81, $T_i$, equation (12) will compute the effective setback external heat transfer conductance, $(U_o A_o)_i$. For most enclosures 30 that are built on a slab or have unheated basements 49, etc., the two conductances will not be exactly the same value. Therefore, they are related through the following simplified relationship:

$$(U_o A_o)_i = (U_o A_o)_f - F^*(T_o - T_i) \quad (13)$$

where the coefficient, $F^*$, can be determined from the measurement of the two conductances, $(U_o A_o)_f$ and $(U_o A_o)_i$ and their corresponding temperatures, $T_f$ and $T_i$. The processing means for computing these enclosure parameters are contained in the estimator 66.

Efficiency of Primary Energy Source of the Climate Control System; $\eta_f$

Although it is not required by the non-linear efficiency model, the efficiency, $\eta_f$, of the primary energy source (furnace, heat pump, etc.) of the climate control system 18 can readily be measured and would be a parameter of interest if the parameter estimation system was being used independently for purposes of building and climate control system evaluation, diagnostic testing or inspection. The only additional measurements required are the temperatures of the distributed air taken at the inlet and outlet of the furnace 20, $T_{f,i}(t)$ and $R_{f,o}(t)$, which must be measured as a function of time. Also necessary is the mass flow of the distributed air, m, the specific heat of air at constant pressure, $c'_p$, the climate control cycle time, $t_c$, and the blower cycle time $t_b$. Therefore, the average energy rate, $E_f$, delivered by the climate control system 18 during a cycle, $t_c$, is indirectly measurable from the following integral equation:

$$E_f = m c_p \cdot \frac{1}{t_c} \int_{t'=0}^{t_b} \{T_{f,o}(t') - T_{f,i}(t')\}dt' \quad (14)$$

As was done before with equation (4), the integral can be evaluated numerically in terms of the discrete temperature measurements made during the cycle time $t_c$; thus $$E_f = m \frac{t_b}{t_c} c_f \cdot \frac{1}{n} \sum_{j=1}^{n} (T_{f,o,j} - T_{f,i,j}) \quad (15)$$

The furnace efficiency, $\eta_f$, can be indirectly measured for a given cycle in terms of the average energy rate delivered by the furnace 20, $E_f$, and the average input energy rate, $E_g$. Therefore, from equations (15) and (8):

$$\eta_f = \frac{E_f}{E_g} = \frac{t_b}{t_c} \frac{m c_p'}{E_{g,0}} \cdot \frac{1}{n} \sum_{j=1}^{n} (T_{f,o,j} - T_{f,i,j}) \quad (16)$$

Effective Internal Heat Transfer Conductance; (hA)

The measurement of the effective conductance, hA, between the thermal capacitance 55, within the enclosure 30 (internal walls and contents) and the inside air 28 within the enclosure 30, first requires the measurement of the secondary time constant, $\tau_1$, and the energy recovery time constant, $\tau^*$, as is described in the following paragraphs:

Referring to FIG. 2, when moving from the first occupancy comfort temperature 39, $T'_f$, to the setback temperature 81, $T'_i$, the temperature of the conditioned space, T', initially decreases very rapidly for a short period of time. This is referred to as the initial response 43. After the initial response, the temperature, T', responds more slowly, this is referred to as the secondary response 41. Only two direct temperature measurements are necessary in determining the secondary time constant, $\tau_1$, used to describe the secondary response 41. The measurements needed are the temperature of the conditioned space 28 as a function of time, T'(t), and the outdoor air temperature as a function of time, $T_o(t)$. These measurements will not be taken until after the initial response 43 is complete. The relationship of the secondary response 41 is an exponential function of time of the form: where $T'(t)_{t=0}$ represents the first measurement taken after the initial response 43, and time, t, $$\frac{T'(t) - T_o(t)}{T'(t)_{t=0} - T_o(t)} = e^{-\frac{1}{\tau_1} t} \quad (17)$$

represents the elapsed time to each consecutive measurement, measured from the time of the first measurement.

A method such as the classical "method of least-squares" can be used to find the value of the secondary time constant $\tau_1$, which best fits the measured data.

Referring again to FIG. 2, the energy recovery time constant, $\tau^*$, has to do with the response of the average input energy rate 82, $E_g$, after the temperature recovery time 40, $t_r$, that is after the air in the conditioned space 28 returned to the occupancy comfort temperature 39, $T_f$. Energy recovery is different from temperature recovery in that it is associated with the process of restoring the energy to the thermal capacitance 55 that was lost during the time the thermostat was setback, $(t_3 - t_1)$. The only two measurements necessary are the indirect measurement of the average energy rate delivered to the conditioned space, $E_s(t)$, during a climate control system cycle time, $t_c$, for successive cycles during the energy recovery 82, and the time, t, to the center of each successive cycle.

The relationship of the energy recovery response is an exponential function of time of the form:

$$\frac{E_s(t) - E_{s,f}}{E_s(t)_{t=0} - E_{s,f}} = e^{-\frac{1}{\tau^*} t} \qquad (18)$$

where $E_s(t)_{t=0}$ represents the first measurement of the average energy rate delivered to the conditioned space (during the first climate control system cycle) after temperature recovery, $E_{s,f}$ represents the average energy rate after quasi-steady state condition has been reached, and the time, t, represents the time lapsed from time of temperature recovery to the center of each successive climate control system cycle during the energy recovery response 82. Again, a method such as the classical "method of least-squares" is used to find the value of the energy recovery time constant, $\tau^*$, which best fits the measured data.

The effective internal heat transfer conductance, (hA), is related to the secondary time constant, $\tau_1$, the energy recovery time constant, $\tau^*$, the external heat transfer conductance, $(U_oA_o)_f$, and the thermal capacitance of the air in the conditioned space $(\rho'c'_pV')$, and is determined as follows:

$$(hA) = (U_oA_o)_f \left( \frac{\rho'c_p'V^*}{(U_oA_o)_f} \frac{1}{\tau^*} - 1 \right) \qquad (19)$$

Effective Thermal Capacitance: (Mc_v)

The effective thermal capacitance of the internal walls, furniture and contents of the building, (Mc_v), is computed by taking the product of the energy recovery time constant, $\tau^*$, and the effective internal heat transfer conductance, (hA). This relationship is shown by the equation:

$$(Mc_v) = \tau^*(hA) \qquad (20)$$

It is possible for the parameter estimation system to indirectly measure all of the above-described parameters during a typical occupancy comfort schedule 39, including a thermostat setback schedule 80, providing various test criteria are met. The various test criteria are necessary to ensure system robustness and thus viable parameter measurements.

ENERGY PREDICTION METHODOLOGY

The predictor system involves a mathematically formulated thermodynamic model of the enclosure 30 and its associated climate control system 18 which utilizes the measured thermal and thermodynamic parameters determined and stored in the registers 45 or database 45, along with the measured outdoor air temperature, to determine in advance of implementation, the optimum thermostat setback schedule 80 which, while maintaining the user-specified occupancy comfort schedule 39, minimizes the input energy consumption of the climate control system 18. The non-linear efficiency model which has been developed consists of three differential equations which represent the major physical mechanisms governing the thermal and thermodynamic processes involved. These equations are non-linear whenever n does not equal 0. The non-linear efficiency model processor means 72 utilizes a differential equation governing the average temperature, T', of the conditioned space 28 within the enclosure 30. The differential equation is shown below:

$$\tau\tau' \frac{d^2T'}{dt^2} - \left( \frac{(b-1)}{b} \tau - b\tau' \right) \frac{dT'}{dt} - T' = \qquad (21)$$

$$\frac{1}{(hA)} \left( \tau \frac{dE_s}{dt} + bE_s \right) - \frac{b}{(hA)} (Q_i + Q_s) + T_0$$

The non-linear efficiency model processor means 72 also utilizes a different differential equation which governs the average temperature, T, of the thermal capacitance (internal walls, contents, etc.) of the enclosure 30:

$$\tau\tau' \frac{d^2T}{dt^2} - \left( \frac{b+1}{b} \tau + b\tau' \right) \frac{dT}{dt} + T = \qquad (22)$$

$$\frac{b}{(hA)} \{E_s - Q_i\} - \frac{b+1}{(hA)} Q_s + T_0$$

And finally, the processor means 72 utilizes the differential equation governing the rate at which energy is delivered to (heating) or removed from (cooling) the conditioned space, $E_s$, by the climate control system 18:

$$\tau_s \frac{dE_s}{dt} - E_s = \eta_s E_g \qquad (23)$$

where the non-linear climate control efficiency, $\eta_s$, is given by:

$$\eta_s = a_0 E_g^n \qquad (24)$$

and the coefficients within the above three differential equations are $$\tau = \frac{Mc_v}{(U_oA_o)_f} \quad \tau' = \frac{\rho'c_p'V^*}{(hA)} \qquad (25)$$

$$\tau = \frac{Mc_v}{(U_oA_o)_f} \quad \tau' = \frac{\rho'c_p'V^*}{(hA)} \qquad (25)$$

$$b = \frac{(hA)}{(U_oA_o)_f} \quad (U_oA_o)_i = (U_oA_o)_f - f^*(T'_f - T'_i) \qquad (26)$$

wherein:

f* = a coefficient determined by the enclosure parameter estimation means 66 relating the effective external heat transfer conductance, $(U_oA_o)_i$, at the thermostat setback (or setup) temperature, $T'_i$, to the effective external heat transfer conductance, $(U_oA_o)_f$, at the thermostat set-point temperature, $T'_f$, and the difference between the set-point temperature, $T'_f$, and the setback (or setup) temperature, $T'_i$;

(hA) = the effective internal heat transfer conductance between the air in the conditioned space and the thermal capacitance of the internal walls, furniture and other contents of the building, as determined by the enclosure parameter estimating means 66.

The three coupled differential equations (21), (22) and (23) governing the thermal characteristics of the enclosure 30 and its associated climate control system 18 can be solved by the non-linear efficiency model processor 72 using classic mathematical solution techniques for the five different time domains 40, 42 of the typical occupancy comfort 39 and thermostat setback 80 schedules depicted in FIG. 2. Although FIG. 2 is for a heating mode, those skilled in the art will recognize that a similar figure and solution technique would exist for a cooling mode. The user-specified occupancy comfort schedule 39 is represented by the two time domains $(t_0-t_1)$ and $(t_4-t_5)$ where the conditioned space 28 temperature is at the occupancy comfort temperature, $T_f$.

It should be noted that in reality the air temperature oscillates around the occupancy comfort temperature because the thermostat cycles the climate control system 18 as a means of modulating the energy output. However, the theoretical model ignores the temperature oscillation and predicts the mean value. The required input energy rate, $E_g$, during the initial quasi-steady state time domain, $(t_0-t_1)$, is predicted by solving equations (21), (23) and (24) simultaneously. The total input energy, $E_{g,1}$, required during the initial time domaine, $(t_0-t_1)$, is obtained by integrating the energy rate, $E_{g,f}$, over the initial time domain.

The cooling of the temperature of the conditioned space 28 following thermostat setback (where $E_g=0$) can be predicted by simultaneously solving equations (21) and (23) subject to the initial condition that exists at time, $t_1$. The cooling time, $t_s$, which is the amount of time necessary for the air temperature, $T'$, to cool down to the setback temperature, $T_i$, is obtained by using a classical iterative technique such as the "method of bi-section." The cooling of the temperature of the thermal capacitance,T, (internal walls and contents) of the conditioned space 28 can be predicted by solving the equations (22) and (23) subject to the initial condition that exist at time, $t_1$.

During the quasi-steady state setback time, 81 the required input energy rate, $E_g$, is predicted by the simultaneous solution of equations (21), (23) and (24), subject to the initial conditions at time, $t_2$. The total required input energy, $E_{g,3}$, during time domain, $(t_2-t_3)$, is obtained by integrating the energy rate, $E_g$, over the time domain. Although the air temperature of the conditioned space is held at the setback temperature, $T_i$ by the thermostat, the temperature of the thermal capacitance 55 (internal walls and contents) of the conditioned space lags the air temperature, and thus continue to cool down during the quasi-steady state setback time. This continued cooling is predicted by solving equation (22) subject to the initial conditions at time, $t_2$.

Times $t_0$, $t_1$, $t_4$, and $t_5$ are specified as part of the user-specified occupancy comfort schedule 39 (refer to example above). However, times $t_2$ and $t_3$ depend upon the thermal and thermodynamic parameters of the enclosure 30 and its associated climate control system 18 as well as the outdoor air temperature. Thus, time $t_2$ depends upon the predicted cooling time, $t_s$, and the time, $t_3$, depends upon the temperature recovery time, $t_r$. The prediction of the cooling time was discussed above. The temperature recovery time, $t_r$, is the amount of time necessary for the air temperature to be raised from the setback temperature which exists at time, $t_3$ to the occupancy comfort temperature, $T'_f$ usually with the climate control system 18 operating at maximum capacity. The air temperature during the recovery time, $t_r$, is predicted using the temperature recovery time predictor means 74 which solves the equations (21) and (23) subject to the initial conditions that exist at time $t_3$, where the recovery time, $t_r$, is obtained by again using some classical iterative techniques such as the "method of bi-section."

The temperature, T, of the thermal capacitance 55 (internal walls and contents) of the conditioned space 28 is predicted during the recovery time, $t_r=(t_4-t_3)$, by solving equations (22) and (23), subject to the initial conditions wnicn exist at time, $t_3$. The required input energy rate, $E_{g,0}$, represents the maximum input energy rate for the heating system, and the total input energy, $E_{9,4}$, for the recovery time domain, $(t_3-t_4)$, is obtained by integrating the energy rate, $E_{g,0}$ over the recovery time, $t_r$.

During the occupancy comfort time domain, $(t_4-t_5)$, the temperature of the air in the conditioned space 28 is held at the occupancy comfort temperature, $T_f$, by the thermostat assembly 10. The temperature,T, of the thermal capacitance (internal walls and contents) of the conditioned space 28 during the time domain is predicted by solving equations (22) and (23), subject to the initial conditions at time $t_4$. The required input energy rate, $E_g$, is predicted by simultaneously solving equations (21),(23) and (24) subject to the initial conditions at time $t_4$. The total input energy, $E_{g,5}$, is obtained by integrating the input energy rate, $E_g$, over the time domain, $(t_4-t_5)$.

The predicted total input energy, $E_{g,t}$, for the entire occupancy comfort 39 and the thermostat setback 80 schedule is the sum of input energy required for each of the five time domains involved and is described by the equation:

$$E_{g,t} = E_{g,1} + E_{g,3} + E_{g,4} + E_{g,5} \qquad (27)$$

since $E_{g,2}=0$.

The predicted input energy required if there was no thermostat setback, $E_{g,f}$, is the quasi-state steady state input energy rate, $E_g$, integrated over all five time domains. Therefore, the predicted input energy savings achieved by carrying out the thermostat setback schedule 80 is computed by Percent Energy Savings=

$$100 \frac{E_{g,f} - E_{g,t}}{E_{g,f}} \qquad (28)$$

The determinization of the optimum thermostat setback schedule 80 which, while maintaining the user-specified occupant comfort schedule 39, i.e., the comfort temperature $T_f$ during the specified time domains, $(t_0-t_1)$ and $(t_4-t_5)$, minimizes the input energy consumption of the climate control system 28. The optimization process 76 utilizes the above described solution technique along with some type of optimization scheme such as the "golden-section" search method for determining the optimum thermostat setback schedule 80 which requires the minimum energy input, and thus represents the maximum energy savings. The optimum schedule 80 includes the setback time, $t_1$, the setback temperature, $T_i$, (not to be below some specified base) and the setup time, $t_3$, which is determined from the user-specified occupancy comfort time, $t_5$, and the predicted temperature recovery time, $t_r$.

The setback temperature $T_i$, as shown in FIG. 2, represents the base or floor which the temperature will not pass below (or above in the case of a cooling climate control system). Therefore, keeping with the example above, the subject invention 10 may determine the optimum setback temperature, in terms of energy consumption, may be 67° F. and not allow the temperature fall below this more energy efficient temperature.

In contradistinction, the subject invention 10 may determine the optimum setback temperature to be 61° F. In this situation, the subject invention 10 will not allow the temperature to droop below the setback temperature $T_s$, 65° F., because this temperature $T_i$ is the considered floor below which the temperature is not to drop.

The invention has been described in an illustrative manner, and it is to be understood that the terminology which has been used is intended to be in the nature of words of description rather than of limitation.

Obviously, many modifications and variations of the present invention are possible in light of the above descriptions. It is, therefore, to be understood that within the scope of the appended claims wherein reference numerals are merely for convenience and are not to be in any way limiting, the invention may be practiced otherwise than as specifically described.

What is claimed is:

1. A thermostat assembly (10) for changing the output of a climate control system (18) for an enclosure (30) defining a conditioned space (28) having variable energy consumption and utilizing inside air and outside air, said assembly (10) comprising:
    input means (38) for inputting a schedule (39) having a plurality of transition domains (40) separating a plurality of quasi-steady state domains (42);
    inside sensing means (34) for measuring the temperature of the inside air;
    outside sensing means (36) for measuring the temperature of the outside air, said assembly (10) characterized by
    processing means (44) for storing a non-linear efficiency model and for receiving said temperatures of the inside air and the outside air and for changing at least one of said plurality of domains (40, 42) utilizing said non-linear efficiency model for optimizing the energy consumption as a function of said temperatures of the inside air and the outside air.

2. An assembly (10) as set forth in claim 1 further characterized by energy sensor means (46) for measuring the input energy consumption rate ($E_g$) of the climate control system (18).

3. An assembly (10) as set forth in claim 2 further characterized by circulation flow means (48) for measuring the flow of the distributed air at a central passageway (50) where all of the inside air passes therethrough.

4. An assembly (10) as set forth in claim 3 further characterized by cycle time sensor means (54) for sensing the cycle period ($t_c$) of the climate control system (18).

5. An assembly (10) as set forth in claim 4 further characterized by blower cycle clocking means (52) for measuring the amount of time ($t_b$) a circulation system (32) is operating.

6. An assembly (10) as set forth in claim 5 further characterized by input energy cycle time sensor means (56) for measuring the period of time ($t_e$) during each of the cycle periods in which the climate control system (18) is consuming energy.

7. An assembly (10) as set forth in claim 6 further characterized by distribution air temperature means (58) for measuring the temperature of the distributed air near at least one of a plurality of outlet ports (60) of the climate control system (18).

8. An assembly (10) as set forth in claim 7 further characterized by said distribution air temperature means (58) further including a plurality of distribution air temperature sensors (58), each for sensing the temperature of the distributed air near one of the plurality of outlet ports (60) of the climate control system (18), wherein each of said plurality of distribution air temperature sensors (58) has an output.

9. An assembly (10) as set forth in claim 8 further characterized by distribution air temperature averaging means (70) for averaging the outputs of each of said plurality of distribution air temperature sensors (58).

10. An assembly (10) as set forth in claim 9 further characterized by said non-linear thermal model further including climate control efficiency measuring means (67) for measuring the efficiency $\eta_s$ of the climate control system for the enclosure (30) expressed by the equation:

$$\eta_s = a_o E_g^n$$

wherein
    $E_g$ = input energy consumption rate of the climate control system;
    $a_o$ = empirical coefficient based on data acquired from said sensors; and
    n = empirical exponent based on data acquired from said sensors.

11. An assembly (10) as set forth in claim 10 further characterized by said inside sensing means (34) comprising a plurality of inside air temperature sensors (34) spaced throughout the conditioned space (18), each of said plurality of inside air temperature sensors (34) having an output.

12. An assembly (10) as set forth in claim 11 further characterized by inside air temperature averaging means (68) for averaging the outputs associated with said plurality of inside air temperature sensors (34).

13. An assembly (10) as set forth in claim 12 further characterized by said outside sensing means (36) comprising a plurality of outside air temperature sensors (36) spaced around the enclosure (30), each of said plurality of outside air temperature sensors (36) having an output.

14. An assembly (10) as set forth in claim 13 further characterized by outside air temperature averaging means (77) for averaging the outputs associated with each of said plurality of outside temperature sensors (36).

15. A method for optimizing the energy consumption of a climate control system (18) of an enclosure (30) defining a condition space (28), the method comprising the steps of:
    establishing a schedule (39) defining predetermined temperatures of the condition space (28) at predetermined times;
    measuring the inside air temperature;
    measuring the outside air temperature;
    predicting energy consumption for the schedule (39,80) based on the inside and the outside air temperatures, the method is characterized by non-linarly altering the schedule (80) to optimize energy consumption based on the inside and outside air temperatures.

16. A metod as set forth in claim 15 further characterized by measuring the input energy flow $E_g$ of the climate control system (18).

17. A method as set forth in claim 16 further characterized by measuring the flow of the distributed air at a central passageway (50) of the climate control system (18).

18. A method as set forth in claim 17 further characterized by measuring the amount of time a circulation system (32) is operating.

19. A method as set forth in claim 18 further characterized by measuring the cycle period of the climate control system (18).

20. A method as set forth in claim 19 further characterized by measuring the period of time during each of the cycle periods of the climate control system (18) in which the climate control system (18) is consuming energy.

21. A method as set forth in claim 20 further characterized by measuring the temperature of the distributed air near at least one of a plurality of outlet port (60) of the climate control system (18).

22. A method as set forth in claim 21 further characterized by determining the efficiency $\eta_s$ of the climate control system (18) in the enclosure (30) using the equation:

$$\eta_s = a_o E_g^n$$

wherein
$E_g$ = the input energy flow of the climate control system (18);
$a_o$ = empirical coefficient based on data acquired from the climate control system (18); and
$n$ = empirical exponent based on data acquired from the enclosure.

23. A method as set forth in claim 22 further characterized by sensing the inside air temperature at a plurality of locations within the enclosure (30).

24. A method as set forth in claim 23 further characterized by averaging the outputs associated with the plurality of the inside air temperature measurements.

25. A method as set forth in claim 24 further characterized by measuring the outside air temperature at a plurality of locations.

26. A method as set forth in claim 25 further characterized by averaging all of the outside air temperature measurements.

* * * * *

UNITED STATES PATENT AND TRADEMARK OFFICE
CERTIFICATE OF CORRECTION

PATENT NO. : 5,115,967  
DATED : May 26, 1992  
INVENTOR(S) : Gilbert L. Wedekind Page 1 of 2

It is certified that error appears in the above-identified patent and that said Letters Patent is hereby corrected as shown below:

Column 1, line 16,
delete "descriotion", insert --description-- therefor;

Column 12, line 31,
delete "for a climate control parameter estimating means 69";

Column 15, line 35,
(equation 13)), delete "$T_o$-$T_i$" and insert --$T_{o'}$-$T_{i'}$-- therefor;

Column 15, line 54,
delete "$R_{f.o}(t)$" and insert --$T_{f.}(t)$-- therefor;

Column 16, line 43,
after "form:" move equation (17) thereto;

Column 16, line 47, (Equation 17),
, $\frac{T(t)}{T(t)_{t=0}}$ and substitute --$\frac{T'(t)}{T'(t)_{t=0}}$-- therefor;

Column 17, line 30,
delete "V" and insert --V'-- therefor;

Column 18, lines 7 through 11 (Equation 11),
the equation should read as follows:

$$\tau\tau'\frac{d^2T'}{dt^2} + \{\frac{(b+1)}{b}\tau + b\tau'\}\frac{dT'}{dt} + T' = \frac{1}{(hA)}\{\tau\frac{dE_s}{dt} + bE_s\} + \frac{b}{(hA)}(Q_i + Q_s) + T_0$$

UNITED STATES PATENT AND TRADEMARK OFFICE
CERTIFICATE OF CORRECTION

PATENT NO. : 5,115,967
DATED : May 26, 1992
INVENTOR(S) : Gilbert L. Wedekind

It is certified that error appears in the above-identified patent and that said Letters Patent is hereby corrected as shown below:

Column 18, line 45, delete equation 25.

Column 18, line 47, delete "V" and insert --V'-- therefor.

Column 20, line 4, delete "t.." and insert --$t_r$-- therefor.

Column 20, line 14, delete "$E_{9,4}$" and insert --$E_{g,4}$-- therefor.

Column 20, line 65, delete "$t_5$" and insert --$t_4$-- therefor.

Column 21, line 10, delete "droop" and insert --drop-- therefor.

Column 22, line 67, delete "theoutside" and insert --the outside-- therefor.

Signed and Sealed this

Sixth Day of October, 1992

Attest:

DOUGLAS B. COMER

Attesting Officer      Acting Commissioner of Patents and Trademarks

UNITED STATES PATENT AND TRADEMARK OFFICE
CERTIFICATE OF CORRECTION

PATENT NO. : 5,115,967

DATED : May 26, 1992

INVENTOR(S) : Gilbert T. Wedekind

It is certified that error appears in the above-identified patent and that said Letters Patent is hereby corrected as shown below:

Column 12, line 56, after "$T_d(t)$" insert --and the temperature of the inside air, $T'(t)$ --.

Signed and Sealed this

Twenty-second Day of June, 1993

Attest:

MICHAEL K. KIRK

*Attesting Officer*  Acting Commissioner of Patents and Trademarks